United States Patent
Real et al.

(10) Patent No.: US 9,449,372 B2
(45) Date of Patent: Sep. 20, 2016

(54) DUST REMOVAL TECHNOLOGY FOR DRIVER VISION LEVERAGE

(71) Applicant: BAE SYSTEMS INFORMATION AND ELECTRONIC SYSTEMS INTEGRATION INC., Nashua, NH (US)

(72) Inventors: Edward C. Real, Nashua, NH (US); Melissa L. Chevalier, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 38 days.

(21) Appl. No.: 14/457,805

(22) Filed: Aug. 12, 2014

(65) Prior Publication Data

US 2015/0055826 A1    Feb. 26, 2015

Related U.S. Application Data

(60) Provisional application No. 61/868,613, filed on Aug. 22, 2013.

(51) Int. Cl.
*G06T 5/00* (2006.01)
*G06T 7/20* (2006.01)
*G06T 5/10* (2006.01)
*G06T 5/50* (2006.01)

(52) U.S. Cl.
CPC .............. *G06T 5/002* (2013.01); *G06T 5/008* (2013.01); *G06T 5/10* (2013.01); *G06T 5/50* (2013.01); *G06T 7/204* (2013.01); *G06T 2207/10048* (2013.01); *G06T 2207/20182* (2013.01); *G06T 2207/30212* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,031,540 A | 2/2000 | Golin et al. |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |

(Continued)

OTHER PUBLICATIONS

Edward C. Real et al., Two Algorithms for Fast Approximate Subspace Tracking, IEEE Transactions on Signal Processing, vol. 47, No. 7, Jul. 1999.

(Continued)

*Primary Examiner* — Utpal Shah
(74) *Attorney, Agent, or Firm* — Sand & Sebolt, LPA; Scott J. Asmus; Daniel J. Long

(57) ABSTRACT

A system includes a way of improving an image obscured by airborne particles. The system includes a decomposition processor and an image generation processor. The decomposition processor decomposes an object of interest moving in a first image at a first rate of speed into at least one first subspace vector. This decomposition processor also decomposes fine particles moving at a different rate of speed than the object in the first image into at least one second subspace vector. The fine particles obscure the object of interest in a second image. The image generation processor generates based, at least in part on the first subspace vector and the second subspace vector, an image of the object without some of the fine particles obscuring the object of interest.

17 Claims, 2 Drawing Sheets

(56) References Cited

U.S. PATENT DOCUMENTS

| | | |
|---|---|---|
| 6,683,608 B2 | 1/2004 | Golin et al. |
| 6,738,073 B2 | 5/2004 | Park et al. |
| 7,196,722 B2 | 3/2007 | White et al. |
| 7,945,061 B1 | 5/2011 | Smith et al. |
| 8,754,943 B2 | 6/2014 | Klaerner et al. |
| 2003/0086000 A1 | 5/2003 | Siemens et al. |
| 2004/0033472 A1 | 2/2004 | Varshneya |
| 2005/0251347 A1* | 11/2005 | Perona ............... G06K 9/00134 702/19 |
| 2007/0219686 A1 | 9/2007 | Plante |
| 2009/0062944 A1 | 3/2009 | Wood et al. |
| 2009/0322874 A1 | 12/2009 | Knutson et al. |
| 2009/0326991 A1 | 12/2009 | Wei et al. |
| 2010/0245539 A1 | 9/2010 | Lin |
| 2011/0051993 A1* | 3/2011 | Caballero .......... G06K 9/00771 382/100 |
| 2011/0052029 A1* | 3/2011 | Connah ................ G06T 5/50 382/131 |

OTHER PUBLICATIONS

Tank Crews will be able to 'Check Six' with new Rear View Camera, Mar. 7, 2007 http://defense-update.cominewscast/0307/news/070307_drvc.htm.

* cited by examiner

DUST REMOVAL TECHNOLOGY FOR DRIVER VISION LEVERAGE

CROSS REFERENCE TO RELATED APPLICATION

This application claims priority from U.S. Provisional Application Ser. No. 61/868,613, filed Aug. 22, 2013; the disclosure of which is incorporated herein by reference.

BACKGROUND OF THE INVENTION

1. Field of Invention

The current invention relates generally to apparatus, systems and methods for removing clutter from images. More particularly, the apparatus, systems and methods relate to digitally removing images of unwanted particles blowing across images. Specifically, the apparatus, systems and methods provide for digitally removing imagery of unwanted particles that are moving at a first speed from an image while not digitally removing objects of interest that are moving at a second speed that is different than the first speed.

2. Description of Related Art

Throughout history man has desired to create realistic images. In the "cave man days" men (and women) strove to create realistic images of their world on rocks and/or cave walls so that they could document their experiences and environment to others. Of course, they did this using primitive chalk and other coloring devices and/or other drawing tools. Later, the printing press was invented to allow books to be mass produced so that many more people could share the same written documents and entire books. More recently modern color books, magazines, newspapers and the like have been mass produced to allow many people to share a wide variety of printed audio-visual content. Additionally, video content now allows one to view a continuous stream of images to allow one to view movements rather than still images one by one. Today, more advanced Infrared (IR) imaging is being utilized to enable drivers of motor vehicles to see roads or other paths they desire to travel while operating in conditions such as those after sunset. One of the issues that may arise for motorist viewing roads is that during sandstorms, snow storms, and/or if smoke happens to obscure the image, the IR system fails to penetrate the small particle debris which will obscure their vision and prevent them from clearly seeing a path of travel. What is needed is a better way of producing images cluttered by fine particles in an original image.

SUMMARY

One aspect of an embodiment of the invention includes a system for improving an image obscured by airborne particles. The system includes a decomposition processor and an image generation processor. The decomposition processor decomposes an object of interest moving in a first image at a first rate of speed into at least one first subspace vector. This decomposition processor also decomposes fine particles moving at a different rate of speed than the object in the first image into at least one second subspace vector. The fine particles obscure the object of interest in a second image. The image generation processor generates based, at least in part, on the first subspace vector and the second subspace vector, an image of the object without some of the fine particles obscuring the object of interest.

In another embodiment, a method may provide improving a scene obscured by airborne particles. The method mathematically decomposes a first image of the scene into a first decomposition, wherein the first decomposition includes a first image subspace of an object of interest in the first image. The method next mathematically decomposes a second image of the scene with airborne particles into a second decomposition that includes a second image subspace of the object of interest that includes an airborne particle subspace associated with the airborne particles of the second image. The object of interest is tracked from the first image to the second image based, at least in part, on the first image subspace and the second image subspace to determine a location of the object and an improved image of the object is generated that removes at least some of the airborne particles in the second image. The improved image is created based, at least in part, on the location of the object, the second image subspace and the airborne particle subspace.

In another aspect of the invention, a method of removing airborne particles from an image constructs a projection operator from an image subspace of an original image. Next, a target image of the original images is vectorized based on the projection operator. The target image is reconstructed to its original dimensions and displayed on a video screen.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
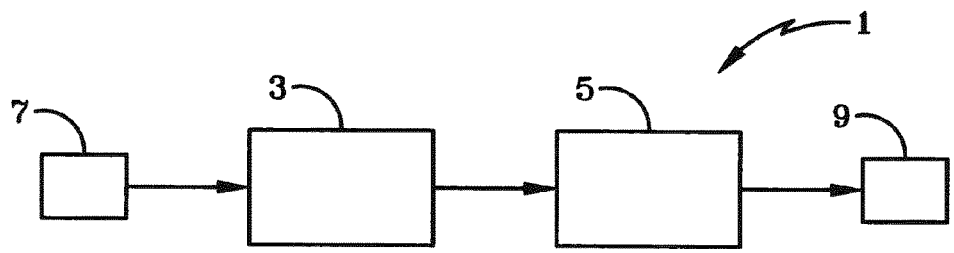
FIG. 1 illustrates a preferred embodiment of a system for enhancing images obscured by fine particles.

FIG. 1 illustrates the preferred embodiment of a system 1 used to track an object obscured by fine particles. The system 1 includes a decomposition processor 3 as well as an image generation processor 5. "Processor" and "Logic", as used herein, includes but are not limited to hardware, firmware, software and/or combinations of each to perform a function(s) or an action(s), and/or to cause a function or action from another logic, method, and/or system. For example, based on a desired application or needs, logic and/or processor may include a software controlled microprocessor, discrete logic, an application specific integrated circuit (ASIC), a programmed logic device, a memory device containing instructions, or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

Figure 2:
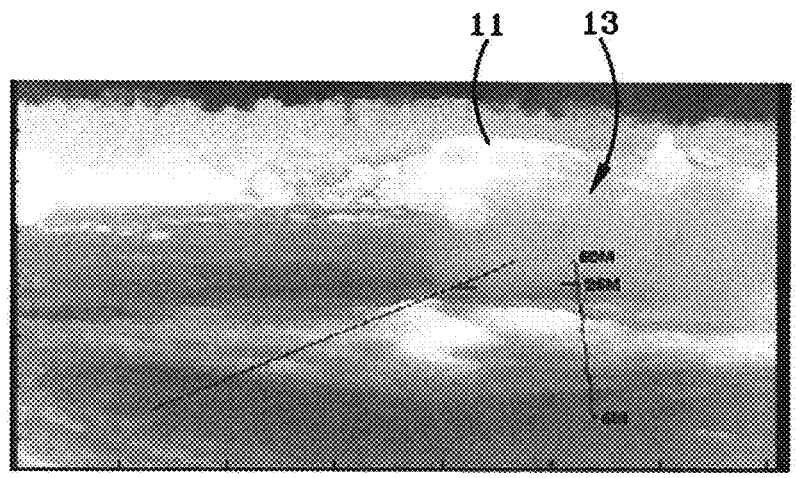
FIG. 2 illustrates an example image obscured by fine particles.
Figure 3:
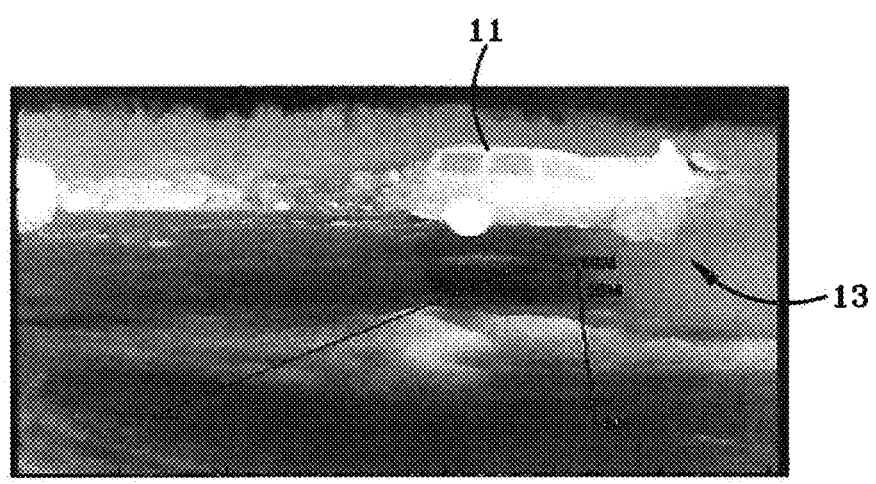
FIG. 3 illustrates an example image that has been processed to remove some of the fine particles from the image of FIG. 2 to create the new image of FIG. 3 that lacks some of the original dust particles of FIG. 2.

The preferred system 1 of FIG. 1 is configured to improve an image 7 input into the system 1 that is an image of a scene obscured by airborne particles such as dust, snow, rain and the like. As discussed below, the system 1 outputs an output image 9 that more clearly illustrates an object of interest in the original image 7 that is unobscured by fine particles such as dust, snow, rain and the like. This improved image is generated and output by the image generation processor 5. As discussed below in detail, the airborne particles can move from frame to frame in different images at a different speed than the primary object of interest so that digital signal processing algorithms running in the decomposition processor 3, as well as the image generation processor 5, are able to remove the airborne particles while creating an output image 9 that more clearly displays the object of interest. For example, FIGS. 2 and 3 illustrate an example car 11 that is an object of interest in FIGS. 2 and 3. In FIG. 3, much of the dust 13 obscuring the car has been removed so that it is more easily seen.

The system 1 can have many practical uses. For example, vehicles traveling through areas that encounter sand, dust, smoke and similar airborne particles can remove those particles from windows, screens and/or displays used by navigators of those vehicles. This would allow navigators of these vehicles to more accurately guide these vehicles using images that are not obscured by small particles such as sand, dust, smoke and the like 13 (as illustrated in example FIGS. 2 and 3).

In a bit more detail, the system 1 in its simplest terms, first mathematically decomposes a first image, which may be a single frame of a series of images. The first image may illustrate a scene with airborne particles and the system 1 can decompose this scene into a first decomposition. The first decomposition includes a first image subspace of an object of interest in the image. Next, the decomposition image processor 5 mathematically decomposes a second image of the scene with airborne particles that include dust, sand, snow and the like. The second image composition includes a second image subspace of the object of interest and includes an airborne particle subspace associated with the airborne particles of the second image.

The system 1 tracks the object of interest between the first and second images (or more images) based, at least in part, on the first image subspace and the second image subspace to determine a location of the object as it travels from the first image to the second image. Those of ordinary skill in this art will realize that the first and second images can be back-to-back images in some frame rate of images that are part of a sequence of video images. The image generation processor 5 uses the second image to generate an improved image that removes at least some of the airborne particles from in front of the object. In the preferred embodiment, the improved image 9 is created by the image generation processor 5 based, at least in part, on the location of the object, the second image subspace and the airborne particle subspace.

As discussed in more detail below, the system 1 of FIG. 1 can mathematically decompose the first image, the second image and subsequent images by creating a singular value decomposition (SVD) of each of the images in a series of images. The generating SVDs can further include generating singular values and vectors of each image as well as tracking changes of the singular values and vectors. The generating of an improved image of the object can, in some embodiments, be based, at least in part, on tracked changes of the singular values and vectors.

In a bit more detail, once images are captured in digital format, images are arrays of numbers. In essence each image is a matrix. As such they can be decomposed in various ways for analysis. Examples include two dimensional Fourier transforms and singular value decompositions (SVDs). A singular value decomposition of a matrix is similar to an Eigen decomposition of a matrix. An advantage of the SVD is that it works on rectangular matrices as well as square ones. Singular value decompositions of matrices (images) are often preferred when analyzing a matrix (image) from an energy content perspective. Singular value decompositions have three components; left singular vectors, right singular vectors and singular values. The left singular vectors span the columns of the decomposed matrix. That is, they form an orthonormal basis set for the columns of a matrix. In an image, these would be the numerical values of the pixels arrayed in the columns of the image. Similarly, the right singular vectors are an orthonormal basis that span the rows of an image. The singular values identify the relative value of the left or right singular vectors in the reconstruction of the image. Singular vectors that are important in the reconstruction have large singular values associated with them. Less important singular vectors have smaller singular values associated with them. Conventionally the singular values are real positive numbers.

In a sequence of images (a movie) the singular values and vectors change from frame to frame. The basis sets formed by the left and right singular vectors rotate in space over time. The associated singular values grow and shrink over time as well, changing the relative importance of the singular vectors in any reconstruction of the images. These changes can be tracked over time in a number of ways in order to monitor how the images, or components of the images, are changing. One way is to compute, from scratch, a singular value decomposition of each image in the sequence and track the changes to the singular values and vectors over time. Another approach is to use a subspace tracker to track only the important singular vectors and values as they evolve over time. A subspace is a space spanned by a particular sub-set of the left or right (or both) singular vectors that make up, in total, the decomposition of a particular matrix (image). In general, subspaces are useful in many contexts for isolating certain characteristics of a signal or image being analyzed. As an example we could select certain frequencies of a Fourier transform for the reconstruction of an image, and ignore the rest. Those selected frequency vectors constitute (span) a particular subspace. The basis sets for singular value decompositions can be organized into subspaces in similar ways.

Images of blowing sand and/or snow alone generally occupy different subspaces than imagery without such obscurants. There may be overlap between these subspaces, but generally they will have at least some parts that are distinct from each other. In one process, these distinct subspaces are identified and tracked over time via subspace trackers such as the FAST algorithm as understood by those of ordinary skill in this art, although other subspace tracking algorithms can be used as well. The individual images in a sequence are then projected into these subspaces in order to separate out those portions of the images that lie in the image subspace (that part that is distinct from the blowing sand and/or snow) from those that reside in the clutter subspace which is dominated by the blowing sand and/or snow. The image component is then reconstructed and displayed to the user (pilot or driver of a ground vehicle).

This is accomplished by turning a predetermined, but programmable, number of images in an image sequence into one dimensional column vectors and arraying them as columns in a matrix. For the examples given, a sliding window of fifty such "vectorized" images is used. However, this number is a parameter that can be set by the user to other different values. As a first step this matrix of images is then analyzed to separate the clutter (blowing sand and/or snow) and image subspaces. Any number of methods can be used for this purpose (e.g., Fourier, or SVD). SVD is the primary example used in this specification but other values and decomposition values can be used. The image subspace is then tracked over time via a subspace tracker applied to the sliding window of images. A projection operator is constructed from the image subspace and a target image is vectorized and projected through that operator. The projected image is then reconstructed to its original dimensions and displayed to the operator.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
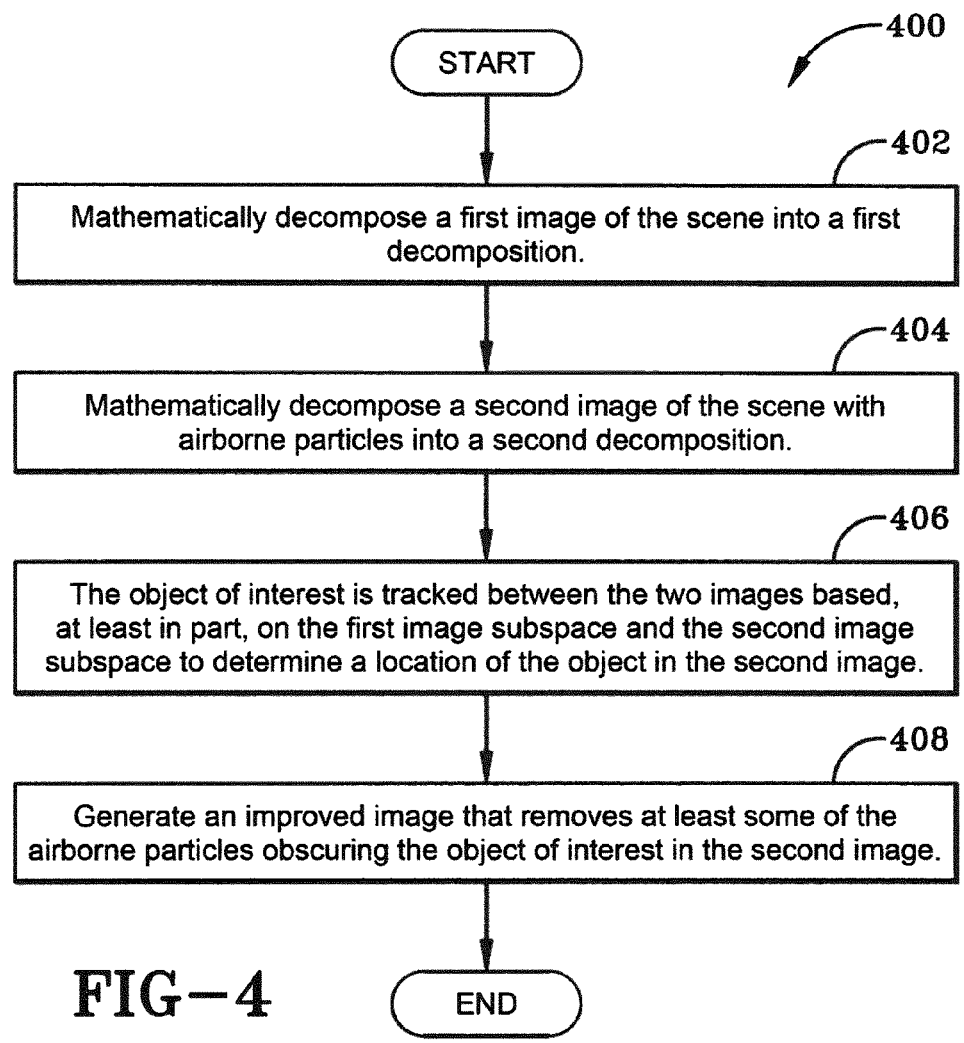
FIG. 4 illustrates an embodiment of a method for removing fine particles of an image in the process of creating a new and clearer image. Similar numbers refer to similar parts throughout the drawings.

FIG. 4 illustrates a method 400 for improving a scene obscured by airborne particles. The method 400 begins at 402 by mathematically decomposing a first image of the scene into a first decomposition. The first decomposition includes a first image subspace of an object of interest in the image. This subspace can be constructed as discussed above. A second image of the scene with airborne particles is mathematically decomposed, at 404, into a second decomposition. The second decomposition includes a second image subspace of the object of interest that also includes an airborne particle subspace associated with the airborne particles of the second image. The object of interest is tracked between the two images, at 406, based, at least in part, on the first image subspace and the second image subspace to determine a location of the object in the second image. At 408, an improved image is generated that removes at least some of the airborne particles obscuring the object of interest in the second image. As discussed above, the improved image is created based, at least in part, on the location of the object, the second image subspace and the airborne particle subspace.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described.

References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method for improving a scene obscured by airborne particles comprising:
    mathematically decomposing a first image of the scene into a first decomposition, wherein the first decomposition includes a first image subspace of an object of interest in the image having singular values and vectors of the first image;
    mathematically decomposing a second image of the scene into a second decomposition, wherein the second decomposition includes a second image subspace of the object of interest having singular values and vectors of the second image that includes an airborne particle subspace associated with the airborne particles of the second image;
    tracking the object of interest based, at least in part, on the first image subspace and the second image subspace to determine a location of the object in the second image; and
    generating an improved image that removes at least some of the airborne particles obscuring the object in the second image, wherein the improved image is created based, at least in part, on the location of the object, the second image subspace and the airborne particle subspace by tracking changes of the singular values and vectors, wherein the generating an improved image of the object is based, at least in part, on tracked changes of the singular values and vectors.

2. The method of claim 1 wherein the mathematically decomposing the first image and the second image further comprise:
    generating a singular value decomposition (SVD) of the first image; and
    generating an SVD of the second image.

3. The method of claim 1 wherein the decomposition of the second image further comprises:
    decomposing the second image into at least one Eigenvector.

4. The method of claim 1 wherein the decomposition of the second image further comprises:
    decomposing the second image into at least one set of Eigenvector and value pairs.

5. The method of claim 4 wherein the at least one set of Eigenvector and value pairs represent at least one of the group of: the second image subspace and the airborne particle subspace.

6. The method of claim 4 wherein the second image is represented by digital values of pixels.

7. The method of claim 6 wherein the pixel values represent voltage or a current value proportional to a power level of each pixel.

8. The method of claim 1 further comprising:
tracking the object of interest based, at least in part, on differences between the first image subspace and the second image subspace; and
generating the improved image based on differences between the first image subspace and the second image subspace.

9. The method of claim 1 wherein the method is implemented to improve an image received by an operator of a vehicle to allow the vehicle to be better maneuvered.

10. The method of claim 1 wherein the method is implemented to allow a rear view from a military vehicle such as a Mine-Resistant Ambush Protected (MRAP) military vehicle.

11. The method of claim 1 further comprising:
tracking orientations of orthogonal i, j, and k vectors as these vectors rotate from the first image to the second image; and
generating the improved image based, at least in part, on a rotational amount of the orthogonal i, j, and k vectors.

12. A system for improving an image from a scene obscured by airborne particles comprising:
a decomposition processor to decompose an object of interest moving in a first image at a first rate of speed into at least one first subspace vector; and
wherein the decomposition processor is configured to decompose the airborne particles moving at a different rate of speed than the object in the first image into at least one second subspace vector, and wherein the airborne particles obscure the object of interest in a second image; and
an image generation processor configured to generate based, at least in part on the first subspace vector and the second subspace vector, an image of the object without some of the airborne particles obscuring the object of interest.

13. The system for improving an image obscured by airborne particles of claim 12 further comprising:
a subspace tracker processor configured to track singular vectors and values as the singular vector and values evolve over time.

14. The system for improving an image obscured by airborne particles of claim 13 wherein the subspace tracker further comprises:
at least one of the group of;
a projection approximation and subspace tracking algorithm, a FAST algorithm and a PASTd algorithm.

15. The system for improving an image obscured by airborne particles of claim 13 wherein the subspace tracker is applied to the sliding window of images.

16. The system for improving an image obscured by airborne particles of claim 13 wherein the subspace tracker is applied to the sliding window of a fixed number of images.

17. The method of claim 1 wherein the first and second images are back-to-back images.

* * * * *